(No Model.)
L. F. CARSTENSEN.
BEARING FOR BICYCLES.
No. 422,723. Patented Mar. 4, 1890.
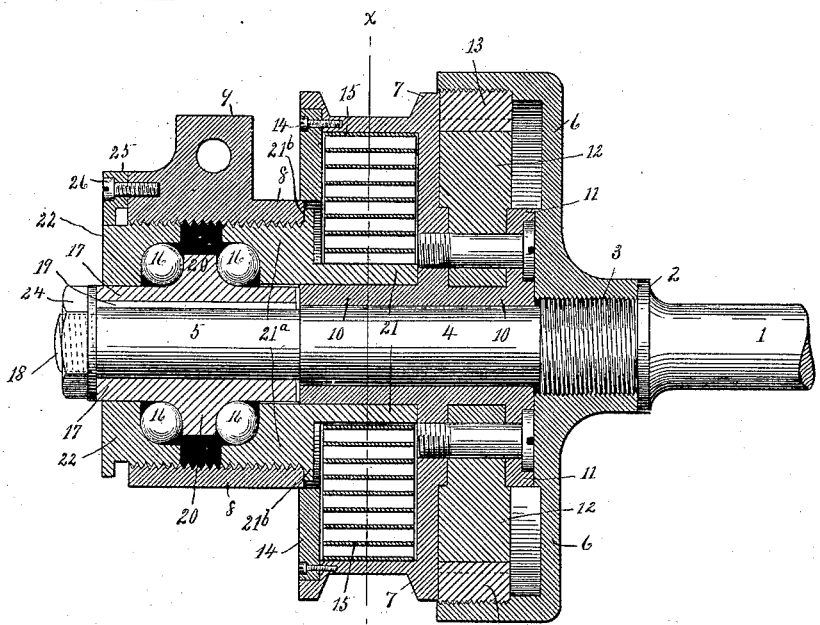
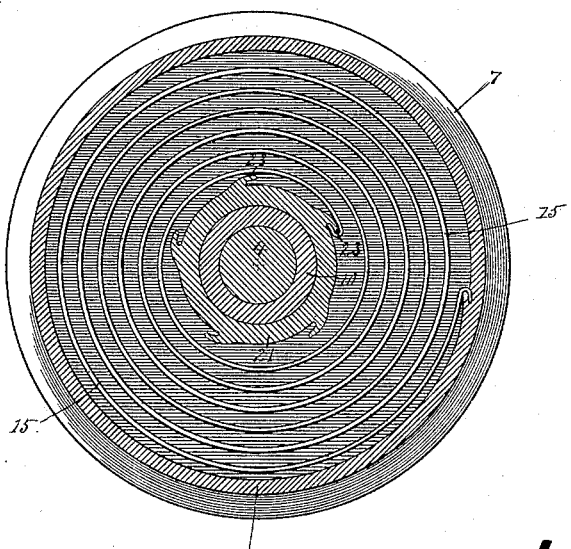
Witnesses
C. M. Newman
A. B. Fairchild
Inventor
Larns Friis Carstensen
By F. M. Wooster
atty

UNITED STATES PATENT OFFICE.

LARNS FRIIS CARSTENSEN, OF BRIDGEPORT, CONNECTICUT, ASSIGNOR TO THE ARMSTRONG MANUFACTURING COMPANY, OF SAME PLACE.

BEARING FOR BICYCLES.

SPECIFICATION forming part of Letters Patent No. 422,723, dated March 4, 1890.

Application filed June 10, 1889. Serial No. 313,726. (No model.)

*To all whom it may concern:*

Be it known that I, LARNS FRIIS CARSTENSEN, a citizen of the United States, residing at Bridgeport, in the county of Fairfield and State of Connecticut, have invented certain new and useful Improvements in Ball-Bearings for Bicycles; and I do hereby declare the following to be a full, clear, and exact description of the invention, such as will enable others skilled in the art to which it appertains to make and use the same.

My invention relates to the class of bicycles illustrated and described in my former Letters Patent, No. 398,228, dated February 19, 1889—that is, bicycles having a rotating axle and in which the ball-case is placed outside of the hub and drum—and has for its object to simplify and improve the construction of the ball-bearings, the special features of novelty being that the entire ball-bearing may be removed for the purpose of cleaning and adjustment, and may be readily replaced without disturbing any of the other parts of the bicycle and without the necessity of going to a machine-shop, the bearing being so constructed that the balls cannot drop out when the bearing is removed, although access may be readily had to them, if required.

With these ends in view I have devised the novel construction of which the following description, in connection with the accompanying drawings, is a specification, numbers being used to denote the several parts.

Figure 1 is a vertical section of the ball-case, hub, and drum, the axle being in elevation; and Fig. 2 is a section on the line $x\ x$ in Fig. 1.

1 denotes the axle, which is provided with a shoulder 2, a threaded portion 3, a portion 4, upon which the sleeve of the drum bears, a reduced portion 5, to which the rotating member of the ball-bearing is secured, and a reduced threaded portion 18 at the outer end.

6 denotes the hub, which is threaded to engage the axle, so as to turn with it in use, the inner end of the hub bearing against shoulder 2.

7 denotes the drum; 8, the shell of the ball-case, having a lug 9, to which the fork is bolted, as in my said former patent, the fork, fulcrum, foot-rest, chain, &c., not being shown, as they form no portion of my present invention.

The bearing of the drum on portion 4 of the axle consists of a sleeve 10, which extends within the hub and is provided at its inner end with a flange 11, which rests against the face of the hub. Between this flange and the back of the drum the pawls 12 are pivoted, as in my said former patent. Upon the inner periphery of the hub is a ratchet 13, which is rigidly secured to the hub, ordinarily by screw-threads, as shown. This ratchet is adapted to be engaged by the pawls, as in my former patent.

The operation of the pawls and of the friction device (not shown) acting in connection therewith, not being of the essence of my present invention, is not deemed to require description in detail.

In practice I construct the ratchet and friction device in accordance with either of the forms illustrated in said patent or in my pending application, Serial No. 313,726, filed of even date herewith.

14 denotes the plate which closes the outer face of the drum, and 15 the spring, the outer end of which is attached to the drum. The attachment of the inner end to the sleeve will presently be more fully explained. The ball-bearing consists of three parts only, two fixed and one rotating, and two series of balls, which I denote by 16.

17 denotes the rotating member of the bearing, which is secured to the reduced portion 5 of the axle by a spline or key 19, engaging a groove, or in any suitable manner; it simply being required that said part shall be held so as to rotate with the axle, but at the same time shall have sufficient longitudinal movement thereon to permit adjustment of the bearing. At the center of part 17—*i. e.*, the rotating member—is a raised portion 20, the opposite sides of which are concave curves, which are engaged by the balls, as clearly shown in Fig. 1. The inner and outer fixed parts of the bearing are respectively a sleeve 21, having an enlarged portion $21^a$, with a shoulder $21^b$, and a ring 22, said ring and the enlarged portion of the sleeve being threaded to engage a corresponding thread upon the inner periphery of shell 8, the shoulder being in practice turned up tightly against the end of the shell. Sleeve 21 extends within the drum and is provided on its outer periphery with a series of lugs 23, either of which is adapted to be engaged by a hook at the inner end of the spring, as is clearly shown in Fig. 2. The outer face of the enlarged portion of the sleeve and the inner face of the ring are provided with concave curves corresponding with the curves of the raised portion of part 17—*i. e.*, the rotating member of the bearing—it being understood, of course, that the ring and sleeve are always stationary. The two series of balls are held in the two sockets formed by the corresponding concave inclines upon the rotating member and the sleeve and ring, as is clearly shown. The entire bearing is held in place upon the axle by a nut 24, engaging the threaded outer end of the axle and bearing against the outer end of part 17.

To remove the bearing it is simply necessary to disconnect the fork and remove nut 24. As there is practically no strain upon the spring, the lug 23, with which it is engaged, slides out of engagement with the hook on the spring without the slightest difficulty. When it is desired to adjust the bearing, the ring is turned slightly either in or out, as may be required. Suppose that it is desired to tighten up the bearing. It is simply necessary to turn ring 22 inward slightly. The pressure of the ring upon the outer series of balls causes the rotating member of the bearing (part 17) to move inward slightly upon portion 5 of the axle and to force the inner series of balls inward against the curved incline on portion 21ª of the sleeve with equal pressure. It will thus be seen that the longitudinal movement of part 17 permits uniform adjustment of both series of balls by a single movement. After the parts of the bearing have been adjusted and replaced in position the ring is locked in place by a key 25, which engages the periphery of the ring, teeth being preferably provided on said ring and key to permit a fine adjustment. The key is rigidly secured in position by a screw 26, engaging the base of lug 9.

After adjusting the ball-bearing and placing it in position in the machine, should it be found that the spring is too loose, it may be readily tightened up by turning the drum backward and permitting the hook at the end of the spring to engage another lug 23 on the sleeve before the fork is connected to lug 9.

Having thus described my invention, I claim—

1. The combination, with a non-rotating shell and inner and outer parts detachably secured thereto and having inclines, of a spring detachably secured to the inner part and a member 17, keyed to the axle, so as to turn therewith, while adapted to slide thereon, and also having inclines, and duplicate sets of balls in the sockets formed by the inclines, so that the entire bearing may be removed from the machine, but all the parts thereof will be held together.

2. In a bicycle, shell 8, threaded upon its inner periphery, and a sleeve extending within the drum and having an enlargement engaging the shell, and a ring, also engaging the shell, said ring and enlargement having concave inclines, in combination with the axle, part 17, secured thereto and having concave inclines corresponding to the inclines upon the ring and sleeve, whereby sockets are formed, duplicate series of balls in said sockets, and a nut engaging the outer end of the axle and bearing against part 17, whereby the bearing is held in place.

3. The combination, with a rotating axle having a part 17 detachably secured thereto and a drum turning on said axle, of shell 8, parts 22 and 21, threaded to engage the shell and forming with part 17 sockets to receive duplicate series of balls, and a spring, one end of which is secured to the inner periphery of the drum and the other detachably secured to part 21, substantially as described.

4. In a bicycle, a rotating axle, a part 17, detachably secured thereto, and a drum having a sleeve turning on said axle, in combination with shell 8, ring 22, threaded to engage said shell, a part 21, having an enlarged portion engaging the shell, a shoulder resting against the shell and lugs 23, and a spring detachably secured to one of said lugs and to the inner periphery of the drum.

In testimony whereof I affix my signature in presence of two witnesses.

LARNS FRIIS CARSTENSEN.

Witnesses:
A. M. WOOSTER,
A. I. MUNSON.